United States Patent [19]

Wirt et al.

[11] 4,349,183
[45] Sep. 14, 1982

[54] SPRING FOR A RING LASER GYRO DITHER MECHANISM

[75] Inventors: Thomas M. Wirt, Malibu; Robert A. Chechile, Thousand Oaks, both of Calif.

[73] Assignee: Litton Systems Inc., Beverly Hills, Calif.

[21] Appl. No.: 175,106

[22] Filed: Aug. 4, 1980

[51] Int. Cl.³ .......................... F16F 1/18; F16F 1/34
[52] U.S. Cl. ................................. 267/160; 356/350; 310/328
[58] Field of Search ............... 310/322, 324; 356/350, 356/328, 331, 323, 106; 74/5 R, 5 F; 267/160

[56] References Cited

U.S. PATENT DOCUMENTS

| | | | |
|---|---|---|---|
| 2,735,731 | 2/1956 | Freebairn et al. | 267/160 |
| 2,842,685 | 7/1958 | Petermann et al. | 310/322 |
| 3,060,334 | 10/1962 | Faure | 267/160 |
| 4,085,825 | 4/1978 | Scarborough | 356/350 |
| 4,115,004 | 9/1978 | Hutchings et al. | 356/350 |
| 4,238,845 | 12/1980 | Haggard et al. | 267/161 |
| 4,261,211 | 4/1981 | Haberland | 267/160 |

FOREIGN PATENT DOCUMENTS 42-65882  10/1967  Japan ..................................... 310/324

Primary Examiner—J. D. Miller
Assistant Examiner—D. L. Rebsch

[57] ABSTRACT

An improved flexure spring assembly for a ring laser gyro dither mechanism using flexure springs between a hub and a rim with each spring driven by four piezoelectric crystal wafers, each spring having a reduced cross-sectional area, moment of inertia, and resistance to bending at its radially outward point of attachment to the rim.

2 Claims, 3 Drawing Figures

SPRING FOR A RING LASER GYRO DITHER MECHANISM

FIELD OF THE INVENTION

This invention pertains to an improved spring for the Improved Laser Gyro Dither Mechanism claimed in U.S. patent application Ser. No. 06/111,154, filed Jan. 11, 1980 by Fred McNair and Thomas M. Wirt which is assigned to Litton Systems, Inc., the assignee of this application. In laser gyroscopes that employ a drive mechanism to introduce a relative rotational movement between a hub and rim about a common axis in a clockwise and counterclockwise direction, this invention pertains to an improved spring and drive arrangement for driving the rim relative to the hub in an oscillatory motion about their common axis.

BACKGROUND OF THE INVENTION

The avoidance of mode locking in laser gyroscopes through the use of mechanically vibrated or individually dithered mirrors is known in the art. Mode locking is the tendency of two counter rotating beams of ring laser radiation to appear to have the same frequency at low levels of angular velocity due to noise or light scattering, thus causing a loss of the desired beat frequency. It is also known in the art to dither or rotate the entire laser gyroscope to prevent mode locking. Dithering of the mirror or the entire gyro causes vibrations which, if transmitted to the case, can interfere with the input or output of other instruments or gyros within a navigational system in which the first gyro is utilized. Elimination of this vibration problem is accomplished by the utilization of an isolation arrangement within each gyro. An example of an isolation system which reduces the vibrational energy of an oscillating gyro may be found in U.S. Letters Patent 4,115,004 by Hutchings et al., which issued on September 19, 1978 and is assigned to the assignee of the present invention.

The isolation system shown within the Hutchings et al. '004 patent utilizes a dual spring system which mounts a counterweight for isolating the oscillatory motion of the gyro. This spring system includes a first set of springs mounted between the frame or case and the gyro and a second set of springs mounted between the case and a counterweight. The dual spring system of Hutchings et al. '004 works well under some conditions but is not a practical system under all operating conditions, such as temperature variations, due to the need to match the springs precisely in each system. The dual system can be fine tuned in the laboratory; but as temperatures vary, the tuning is lost causing an increased amount of vibrational energy to be transmitted to the case of the gyro. One reason it is difficult to tune a dual spring system is that the gyro case must be attached precisely at the node between the two spring systems. The invention of the above cited patent application reduces this problem by attaching the node to the case through a third spring system wherein the point of an attachment need not be as accurate as in a dual spring system.

A prior art example of a single spring system used to damp rather than isolate vibrational energy from an aircraft instrument is shown in U.S. Pat. No. 3,464,657 by Bullard which issued on Sept. 2, 1969 and is assigned to the United States of America. In this system, the single set of springs is connected between the frame and the mounting platform which, in the present invention, is the equivalent of the gyro.

While the preferred ring laser embodiment is a ring laser gyro utilizing a rectangular laser path, it will be understood that gyros utilizing triangular laser paths are also known and that the present invention is not intended to be limited to a rectangular path. A ring gyro laser utilizing a triangular laser path is described in U.S. Pat. No. 4,152,072 by Hutchings which issued on May 1, 1979 and is also assigned to the assignee of the present invention.

For a more basic discussion of the operation of ring gyro lasers, attention is directed to a text book entitled *Laser Applications*, edited by Monte Ross, Academic Press, Inc., New York, N.Y. 1971.

SUMMARY OF THE INVENTION

The present invention utilizes the three-spring system of the above-cited patent application for first mounting a gyro to a housing or case, second mounting the gyro to a counterweight, and third mounting the counterweight to the case. Through that arrangement, it is possible to isolate significantly all angular vibrational energy which would otherwise pass to the case of a ring laser gyro. It is undesirable to utilize the case of the ring laser gyro to provide a reaction to the inertia of oscillation within the laser.

With each flexure spring of the same cross section along its entire length, excess energy is needed to dither the spring assembly. To the end of minimizing the energy expended, it is contemplated by this invention to reduce the cross sectional area and the moment of inertia of that cross sectional area about an axis parallel to the torsional dither axis at one end of each spring for the spring assembly which connects the case to the gyro. The flexure springs may then be bent by piezoelectric crystals attached to such springs. It is contemplated by this invention that the reduced cross sectional area shall be at the radially outward end of each spring. Two properly poled piezoelectric wafers may then be attached to opposite faces of each spring on the hub side of the axis of inflection of the spring and two more piezoelectric wafers may be attached to opposite faces on the rim side of the axis of inflection. The wafers are connected in parallel to a source of alternating voltage of the desired dither frequency. The reduced bending resistance due to the reduced moment of inertia at the end of the spring further reduces the stress on the piezoelectric wafers for a given excursion between the hub and rim.

Accordingly, it is an object of this invention to provide an improved flexure spring between a hub and rim and drive means for oscillating the hub and rim through a limited excursion about their common axis.

It is yet another object to provide a three spring vibration isolation system with an improved third spring and drive mechanism.

DETAILED DESCRIPTION

Figure 1:
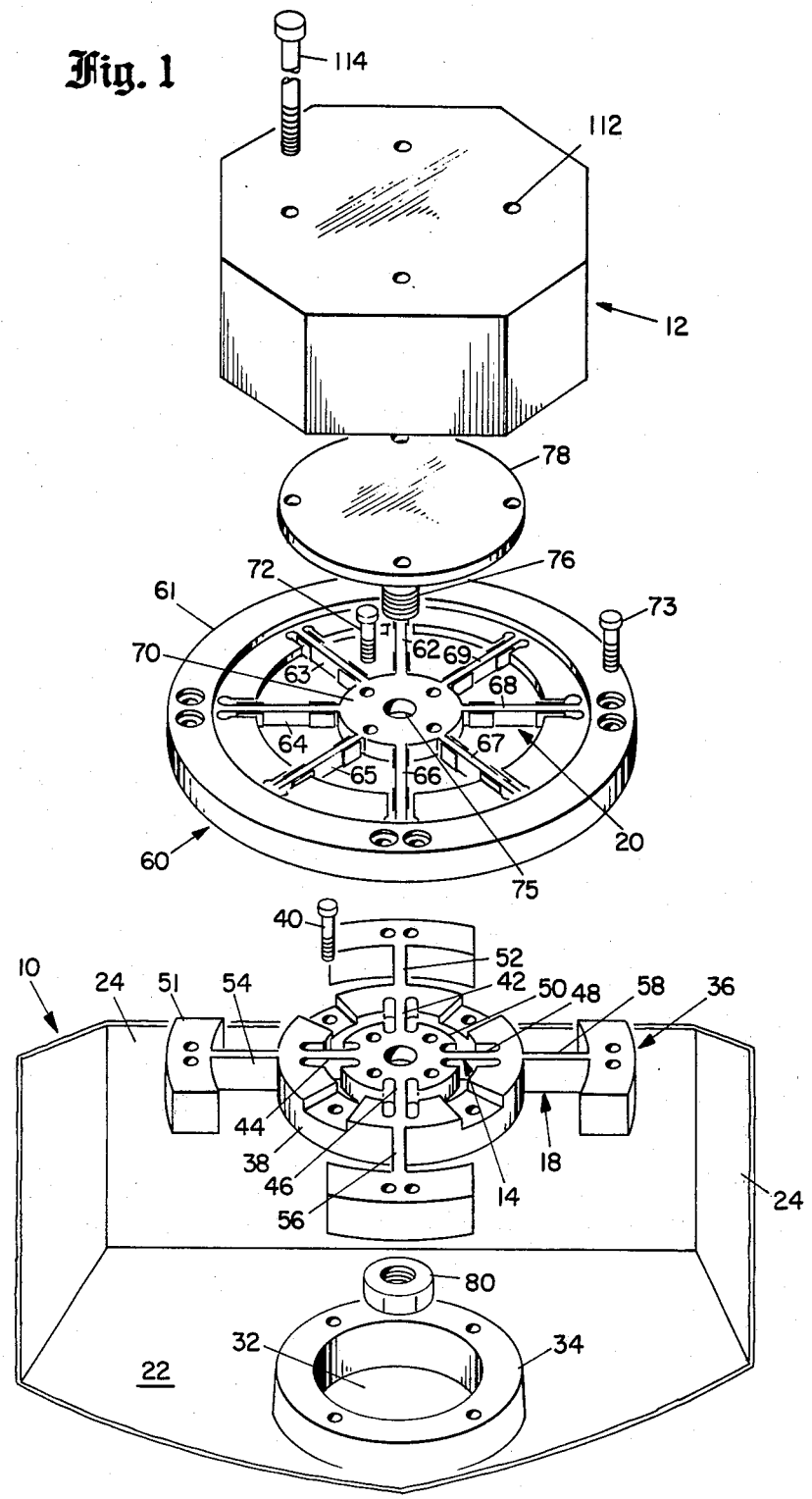
FIG. 1 is an exploded view showing a ring laser gyro mounted on a mechanism which incorporates the present invention.

FIG. 1 is an exploded view of a spring system for angularly oscillating a ring laser gyro 12 about its sensing axis. Because of a counterweight comprising the rim 61 and the split ring 36 together with the spring systems 14, 18 and 20, the oscillatory torque delivered to the gyro 12 is countered by the torque delivered to the counterweight 36, 61, and substantially no torque is delivered to the case 10.

The counterweight 36, 61 connects to the gyro 12 through a spring system 20. The series combination of spring systems 14 and 18 is attached, by screws such as 40, to the case 10 at the node formed between those series of springs.

Case 10 is formed from a flat rectangularly-shaped base 22 having sidewalls 24 that form a cavity which is closed by a rectangular cover (not shown) secured to the sidewalls 24 by screws (not shown) and sealed by an O-ring (not shown). Rectangular base 22 is provided with an aperture 32 surrounded by a toroidally-shaped mounting collar 34. Mounted upon the collar 34 is the flexure structure which incorporates the spring systems 14 and 18.

The flexure structure has a first middle toroidal mounting ring 38 which is coaxially arranged with the case collar 34 and rigidly attached thereto by a plurality of screws 40. The first spring system 14 is composed typically of four radial inwardly-directed rectangular springs 42, 44, 46 and 48 which attach the first middle toroidal ring 38 to an inner mounting hub 50 which is rigidly attached to the gyro 12, its support slate 78, and the hub 70 of the assembly 60. The first middle toroidal ring is also attached to an outer toroidal ring by the second spring system 18 formed from four springs 52, 54, 56 and 58 which extend from the first toroidal ring 38 outwardly toward the outer segmented toroidal ring 36.

Figure 2:
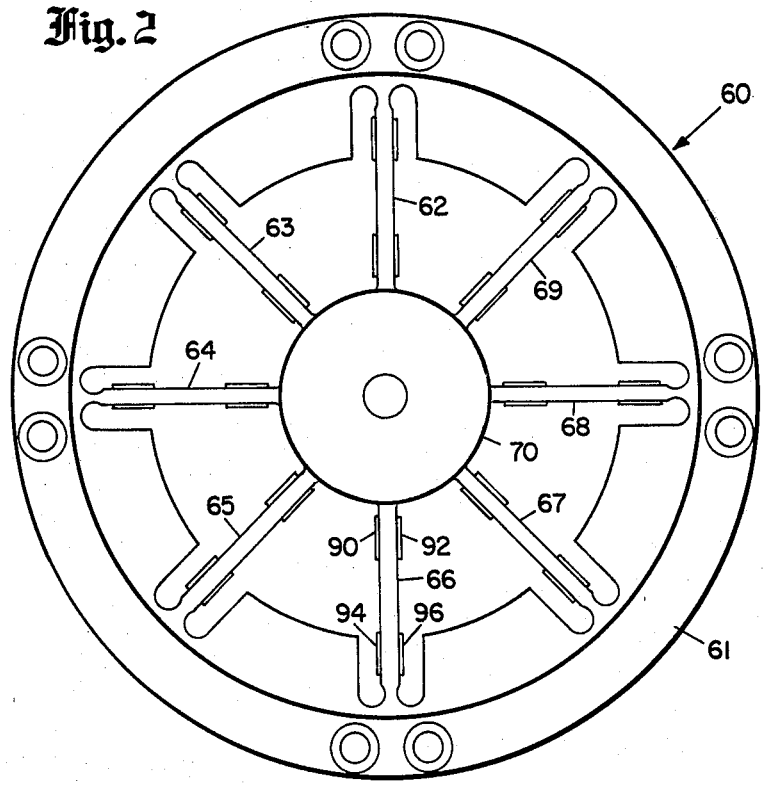
FIG. 2 is a top plan view showing a hub and rim with the improved undeflected set of springs of the present invention.

Mounted to the first flexure structure is a second flexure structure having an outer toroidal rim 61 which is coaxially arranged with the outer split toroidal ring 51 of the first flexure assembly. The outer toroidal rim 61 is connected via a third spring system 20 formed by light radial inwardly-directed springs 62–69 to an inner hub 70 which is coaxially arranged with the inner hub 50 of the first flexure plate. The flexure assembly 60 is best seen in FIG. 2.

The outer toroidal rim 61 of the flexure assembly 60 forms a significant part of second mass of the counterweight. The rim 61 is attached to the split toroidal ring 36 by a plurality of screws 73. Each flexure assembly has a centrally located aperture 74 and 75, respectively, through which passes a stud 76 which extends from the lower surface of a gyro mounting platform 78. The outermost end of the stud 76 is threaded to receive a hex nut 80 which, in combination with screws 63 and 72, unite the first and second flexure assemblies 36 and 60 into a suspension assembly. The mounting screws 72 pass through the inner hub 70 into the inner mounting hub 50, as best seen in FIG. 5.

Mounted upon the gyro-mounting plate 78 is the ring laser gyro 12 whose sensing or input axis is coaxial with stud 76. Clearance holes 112 receive mounting screws 114 which pass through the ring laser body (not shown) into the gyro mounting platform 78 for securing the laser gyro 12.

Figure 3:
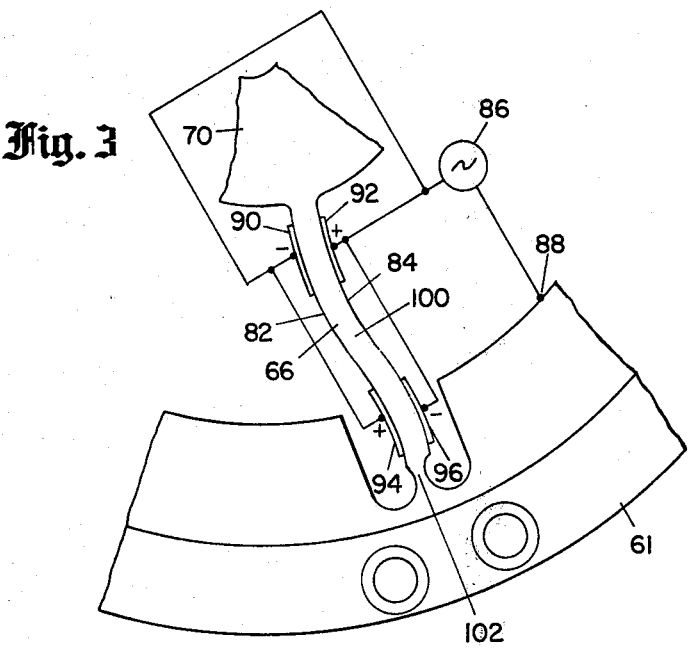
FIG. 3 is a fragmentary enlarged view of a deflected spring of FIG. 2.

The ring laser gyro dither mechanism may be driven by a torque motor, as described in the above-cited application. In a preferred embodiment, the wide, longitudinal surface of each web 62–69 is provided with four thin peizoelectric transducers 90, 92, 94, 96. By impressing a voltage between the faces of these piezoelectric transducers, they are forced to constrict or expand causing the springs and the gyro or counterweight attached thereto to move. Referring to FIG. 3, four piezoelectric crystal wafers 90, 92, 94, 96 are shown attached to opposite circumferentially spaced sides 82, 84 of the rectangular flexure spring 66. Similar crystals are attached to the remaining springs 62 through 69. The crystals are mounted upon spring 66 with their outside faces having the marked polarity so that a positive voltage applied to a positively poled surface of a crystal or a negative voltage applied to a negatively poled surface of a crystal causes that crystal to flex in a direction to make such outside surface concave. When a negative voltage is applied to a positively poled surface of a crystal or a positive voltage is applied to a negatively poled surface of a crystal, it causes the crystal to flex in a direction to make such outside surface convex. The alternating voltage source 86 is connected between the outside surfaces of crystals 90, 92, 94, 96 in parallel and to the spring assembly to make the crystals flex in synchronism with the voltage. The terminal 88 may be attached anywhere to the assembly which is in electrical conductive contact with the conductive spring 66. The crystals are poled and positioned to cause the spring 66 to flex into the position shown in FIG. 3 wherein there is an inflection axis 100 between the crystals 90, 92 and the crystals 94, 96.

To prevent the beam from constraining the rotary oscillatory motion of the member 70 relative to the member 61 and to reduce stress on the crystals, the moment of inertia of the beam 66 about an axis substantially parallel to the axis of torsional dither is reduced at its point of attachment 102 to the rim 61. Clearance is also provided so that the beam 66 may flex in both circumferential directions in synchronism with the alternation of voltage of source 86.

We claim:

1. In the combination of a hub, a rim substantially coaxial with said hub, a plurality of radially directed springs connecting said hub and rim, each said spring being capable of flexing in a circumferential direction to allow limited relative motion between said hub and rim about the common axis of said hub and rim, the flexing of each of said springs having a radially positioned axis of inflection, the improvement comprising:

each of said springs having a reduced moment of inertia about an axis parallel to said common axis and an increased circumferential bending in the region of attachment to said rim.

2. Apparatus as recited in claim 1 in which said springs are substantially identical.

* * * * *